(12) United States Patent
Liao et al.

(10) Patent No.: US 12,199,656 B2
(45) Date of Patent: Jan. 14, 2025

(54) ELECTRONIC DEVICE, SCREEN ASSEMBLY, AND SCREEN PROTECTION MEMBER AND MANUFACTURING METHOD THEREOF

(71) Applicant: Huawei Technologies Co., Ltd., Shenzhen (CN)

(72) Inventors: Jenhui Liao, Shanghai (CN); Hung-Yi Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 470 days.

(21) Appl. No.: 17/612,821

(22) PCT Filed: May 19, 2020

(86) PCT No.: PCT/CN2020/091003
§ 371 (c)(1),
(2) Date: Nov. 19, 2021

(87) PCT Pub. No.: WO2020/233559
PCT Pub. Date: Nov. 26, 2020

(65) Prior Publication Data
US 2022/0224369 A1     Jul. 14, 2022

(30) Foreign Application Priority Data

May 20, 2019   (CN) .......................... 201910418353.6
May 23, 2019   (CN) .......................... 201910436599.6

(51) Int. Cl.
*H04B 1/3888*     (2015.01)
*H04M 1/02*       (2006.01)

(52) U.S. Cl.
CPC ........ *H04B 1/3888* (2013.01); *H04M 1/0268* (2013.01)

(58) Field of Classification Search
CPC .............. H04B 1/3888; H04M 1/0268; H04M 1/0214; H04M 1/185; H04M 1/0266;
(Continued)

(56) References Cited

U.S. PATENT DOCUMENTS

2013/0042581 A1* 2/2013  Holben ................ H04B 1/3888
                                                       206/320
2014/0268519 A1* 9/2014  Huang ................. H04B 1/3888
                                                       361/679.01

(Continued)

FOREIGN PATENT DOCUMENTS

CN    106886253 A    6/2017
CN    206619066 U    11/2017
(Continued)

*Primary Examiner* — Eugene Yun
(74) *Attorney, Agent, or Firm* — Conley Rose, P.C.

(57) ABSTRACT

A screen protection member includes a protection film and a frame. The protection film includes a bonding surface. The frame is fastened to a peripheral region of the bonding surface by surrounding the peripheral region. The frame has at least one notch group. A single notch group includes two notches that are disposed opposite to each other. The at least one notch group divides the frame into at least two frame parts that are spaced apart from each other.

20 Claims, 11 Drawing Sheets

(58) Field of Classification Search
CPC ............ G09F 9/301; G06F 2200/1633; G06F 2200/1634; G06F 1/1641; G06F 1/1652
USPC ..................................................... 455/575.8
See application file for complete search history.

(56) References Cited

U.S. PATENT DOCUMENTS

| | | |
|---|---|---|
| 2016/0363723 A1 | 12/2016 | Choi et al. |
| 2017/0194580 A1 | 7/2017 | Lee |
| 2018/0150106 A1 | 5/2018 | Jang et al. |
| 2019/0081256 A1 | 3/2019 | Kim et al. |
| 2021/0053319 A1 | 2/2021 | Xie et al. |

FOREIGN PATENT DOCUMENTS

| | | |
|---|---|---|
| CN | 107731100 A | 2/2018 |
| CN | 107734113 A | 2/2018 |
| CN | 108922406 A | 11/2018 |
| CN | 109246963 A | 1/2019 |
| CN | 109448553 A | 3/2019 |
| CN | 208609020 U | 3/2019 |
| CN | 109616018 A | 4/2019 |

\* cited by examiner

ELECTRONIC DEVICE, SCREEN ASSEMBLY, AND SCREEN PROTECTION MEMBER AND MANUFACTURING METHOD THEREOF

CROSS-REFERENCE TO RELATED APPLICATIONS

This is a U.S. National Stage of International Patent Application No. PCT/CN2020/091003 filed on May 19, 2020, which claims priority to Chinese Patent application Ser. No. 20/191,0436599.6 filed on May 23, 2019, and Chinese Patent Application No. 201910418353.6 filed on May 20, 2019. All of the aforementioned patent applications are hereby incorporated by reference in their entireties.

TECHNICAL FIELD

Embodiments of this application relate to the technical field of foldable apparatuses, and in particular, to an electronic device, a screen assembly, and a screen protection member and a manufacturing method thereof.

BACKGROUND

To pursue a larger display area and a higher screen-to-body ratio, a bar-type electronic device is continuously evolving into a foldable electronic device (for example, a foldable smartphone). The foldable electronic device includes a foldable frame and a flexible screen fixed to one side of the frame, and the flexible screen can be unfolded and folded with the frame. However, in a process of assembling the flexible screen of the foldable electronic device, the flexible screen needs to be tensioned first, and then the flexible screen in a tensioned state is fastened to a planar outer frame of the electronic device in a surface-to-surface bonding manner. Consequently, an assembling process of the flexible screen is cumbersome.

SUMMARY

Embodiments of this application provide a screen protection member, a screen assembly, and an electronic device that can improve assembly convenience, and further provide a method for manufacturing a screen protection member.

According to a first aspect, an embodiment of this application provides a screen protection member. The screen protection member may be applied to a screen assembly, to protect a flexible display panel of the screen assembly. The screen protection member includes a protection film and a frame. The protection film includes a bonding surface. The frame is fastened to a peripheral region of the bonding surface by surrounding the peripheral region. The frame has at least one notch group. A single notch group includes two notches that are disposed opposite to each other. The at least one notch group divides the frame into at least two frame parts that are spaced apart from each other. In this case, the at least two frame parts of the frame are separated from each other by the notch group and can move relative to each other, for example, can be folded relative to each other and unfolded relative to each other, so that the screen protection member can bend by using a position at which the notch group is located, and the screen assembly to which the screen protection member is applied can be folded and unfolded.

In this embodiment, the frame can stably support the protection film, so that the screen protection member can maintain good flatness. In this case, the screen assembly to which the screen protection member is applied can also maintain good flatness. Therefore, in an electronic device to which the screen assembly is applied, the screen assembly can be assembled by using a mounting procedure (for example, snap-fit) between a rigid frame and another rigid component (for example, a housing assembly) of the electronic device, to replace a conventional tension step and a conventional surface-to-surface bonding step of a flexible screen. Therefore, the mounting procedure between the rigid structures is simple with a low difficulty, and has a low requirement for devices and processes, so that assembly convenience of an assembly process of the entire electronic device is higher.

The protection film may be flexible. The frame may be rigid. Flexibility of the protection film and rigidity of the frame are relative. Strength of the protection film is far less than strength of the frame. In this application, the protection film easily bends when subject to force, and the frame does not easily bend when subject to force.

In an optional embodiment, the frame includes a first frame body and a second frame body and a third frame body that are opposite to each other and located on two sides of the first frame body. The first frame body includes a straight segment and a first bending segment and a second bending segment that are connected to two ends of the straight segment. One notch in each notch group is located on the straight segment. Both the first bending segment and the second bending segment bend toward a side that is of the straight segment and that is away from the protection film. The second frame body straightly extends and one end of the second frame body is connected to the first bending segment. The third frame body straightly extends and one end of the third frame body is connected to the second bending segment.

In this embodiment, the straight segment of the first frame body and the second frame body are connected by using the first bending segment, to be located in different planes, and the straight segment of the first frame body and the third frame body are connected by using the second bending segment, to be located in different planes. The frame is in a three-dimensional structure. In this way, a part that is of the protection film and that is fastened to the straight segment of the first frame body and parts of the protection film that are fastened to the second frame body and the third frame body are located in different planes. The parts of the protection film that are fastened to the second frame body and the third frame body bend relative to the part that is of the protection film and that is fastened to the straight segment of the first frame body. Therefore, the screen protection member has a three-dimensional structure. The three-dimensional structure includes a middle planar region and bending regions on edges on two sides, so that the screen assembly and the electronic device have two smooth side edges, and have better appearance experience and handholding experience.

The frame further includes a fourth frame body disposed opposite to the first frame body. The fourth frame body is connected between an end that is of the second frame body and that is away from the first frame body and an end that is of the third frame body and that is away from the first frame body. The fourth frame body includes a straight segment and two bending segments connected to two ends of the straight segment. The two bending segments are respectively connected to the second frame body and the third frame body. The other notch in each notch group is located on the straight segment of the fourth frame body.

The straight segment of the fourth frame body and the straight segment of the first frame body may be located in a same plane. The second frame body and the third frame body may be located in a same plane.

In another embodiment, the straight segment of the first frame body and the straight segment of the fourth frame body may alternatively be replaced with bending segments. In other words, the first frame body and the fourth frame body may include at least one bending segment. When the first frame body and the fourth frame body include a plurality of bending segments, the plurality of bending segments are smoothly connected to each other.

In an optional embodiment, the first frame body includes a first bearing surface connected to the protection film. A shape of a cross section of the first bearing surface is a straight line segment. The second frame body includes a second bearing surface connected to the protection film. A shape of a cross section of the second bearing surface is an arc segment or a spline curve segment.

In this embodiment, the first bearing surface and the second bearing surface jointly support the protection film, so that a middle part of the protection film is flat and edges on two sides of the protection film bend. In this way, the screen protection member forms a three-dimensional structure, so that the protection film can not only be well supported, but also have bending edges.

In an optional embodiment, the frame includes a first frame body and a second frame body and a third frame body that are opposite to each other and connected to two ends of the first frame body. The first frame body, the second frame body, and the third frame body all straightly extend. One notch in each notch group is located on the first frame body. In this embodiment, a processing difficulty of the frame is relatively low, and costs are relatively low.

In an optional embodiment, the first frame body includes a first bearing surface connected to the protection film. A shape of a cross section of the first bearing surface is a straight line segment. The second frame body includes a second bearing surface connected to the protection film. A shape of a cross section of the second bearing surface is an arc segment or a spline curve segment.

In this embodiment, the first bearing surface and the second bearing surface jointly support the protection film, so that a middle part of the protection film is flat and edges on two sides of the protection film bend. In this way, the screen protection member forms a three-dimensional structure, so that the protection film can not only be well supported, but also have bending edges.

In an optional embodiment, the first frame body includes a first bearing surface connected to the protection film. A shape of a cross section of the first bearing surface is an arc segment or a spline curve segment. The second frame body includes a second bearing surface connected to the protection film. A shape of a cross section of the second bearing surface is an arc segment or a spline curve segment.

In this embodiment, the first bearing surface and the second bearing surface jointly support the protection film, so that a middle part of the protection film is flat and edges on a periphery of the protection film bend. In this way, the screen protection member forms a three-dimensional structure, so that the protection film can not only be well supported, but also have bending edges.

In an optional embodiment, the bonding surface further includes a middle region, and the middle region is surrounded by the peripheral region. The middle region is planar. In this case, when the flexible display panel is fastened to the middle region of the bonding surface, planar display can be performed. Alternatively, a central part of the middle region protrudes in a direction away from the frame relative to a periphery of the middle region, and the periphery of the middle region is located between the central part of the middle region and the peripheral region. In this case, the periphery of the middle region of the bonding surface bends, and continuously bends together with the peripheral region of the bonding surface. The flexible display panel may be partially located on the periphery of the middle region of the bonding surface, to implement four-side-curved-surface display.

In an optional embodiment, the frame is made of a plastic material or a metal material. The protection film may be a plastic film.

In an optional embodiment, a region that is of the protection film and that directly faces the at least one notch group is hollowed out. In this case, when the screen protection member bends by using the position at which the notch group is located, resistance is smaller, and folding and unfolding actions of the screen protection member are easier to implement.

In addition, in a process of manufacturing the screen protection member, a complete frame base member may be fastened to the protection film first, and then a partial material on the frame base member is removed, to form a frame having at least one notch group. In this case, a risk of damaging the protection film can be reduced in a process of removing the partial material on the frame base member, to ensure a manufacturing yield of the screen protection member. Certainly, in the process of manufacturing the screen protection member, alternatively, a complete frame base member may be fastened to a complete protection film base member, and then a partial material on the frame base member and a partial material on the protection film base member are removed synchronously, to form a frame having at least one notch group and a protection film having a hollowed-out region. In this case, a degree of matching between an edge of the notch group and an edge of the hollowed-out region of the protection film is high, and appearance consistency of the screen protection member is better. Certainly, the protection film and the frame may alternatively form the screen protection member by using other steps.

In another embodiment, the region that is of the protection film and that directly faces the at least one notch group may alternatively not be hollowed out. In other words, the protection film is a complete film layer. In this case, the formed frame may be fastened to the protection film to form the screen protection member, to avoid damaging the protection film in a process of processing the frame, so that a product yield of the screen protection member is higher. Certainly, when processing precision is sufficiently high, a complete frame base member may alternatively be fastened to the protection film first, and then a partial material on the frame base member is removed, to form a frame having at least one notch group.

In an optional embodiment, there is one notch group, there are two frame parts, and the two frame parts are symmetrically disposed. In this case, bendable regions of the screen protection member and the screen assembly correspond to a position of the notch group between the two frame parts; in other words, the bendable regions of the screen protection member and the screen assembly are located in central parts of the screen protection member and the screen assembly. The screen assembly can be approximately symmetrically arranged on a first part and a second part that are of the electronic device and that can be unfolded or folded relative to each other, to improve appearance consistency of the electronic device. In addition, the frame may include two frame parts with a same structure, and a requirement of the frame can be satisfied by processing frame parts of only one size, so that material types and costs of the frame can be reduced.

In an optional embodiment, there are two notch groups, there are three frame parts, and two frame parts that are in the three frame parts and that are located on an edge are symmetrically disposed. In this case, the screen protection member has a relatively small quantity of material types and relatively low costs.

According to a second aspect, an embodiment of this application further provides a screen assembly. The screen assembly includes a flexible display panel and the screen protection member in any one of the foregoing embodiments. The flexible display panel is fastened to the bonding surface and is located on an inner side of the frame.

In this embodiment, because the screen protection member has good flatness, the flexible display panel can also be flatly bonded to the bonding surface of the screen protection member, so that the flatness of the screen assembly is high. In addition, during assembly, the screen assembly and another component of the electronic device may be fastened by using a mounting procedure (for example, snap-fit) between a rigid frame and another rigid component (for example, a housing assembly) of the electronic device, to replace a conventional tension step and a conventional surface-to-surface bonding step of a flexible screen. Therefore, the mounting procedure between the rigid structures is simple with a low difficulty, and has a low requirement for devices and processes, so that assembly convenience of an assembly process of the entire electronic device is higher.

According to a third aspect, an embodiment of this application further provides an electronic device. The electronic device includes a foldable housing assembly and the foregoing screen assembly. The housing assembly includes at least two housing parts that can be folded or unfolded relative to each other. The at least two frame parts of the frame of the screen assembly are respectively fastened to different housing parts. In this embodiment, assembly convenience of the screen assembly is high, so that assembly efficiency of the electronic device is high and an assembly difficulty of the electronic device is low.

According to a fourth aspect, an embodiment of this application further provides a method for manufacturing a screen protection member. The method for manufacturing a screen protection member includes:

fastening a protection film to a frame base member, where the frame base member continuously surrounds a peripheral region of a bonding surface of the protection film; and removing a partial material on the frame base member, to form a frame having at least one notch group, where a single notch group includes two notches that are disposed opposite to each other, and the at least one notch group divides the frame into at least two frame parts that are spaced apart from each other.

In this embodiment, based on the method for manufacturing a screen protection member, the integral frame base member is fastened to the protection film first, and then a part of the frame base member is removed to form the frame having at least two frame parts. Therefore, all the at least two frame parts can be fastened to the protection film by using one positioning procedure and one fastening procedure, and a position relationship between the at least two frame parts is accurate and reliable, so that production efficiency is improved, and a product yield is relatively high.

The protection film may be flexible. The frame base member may be rigid. For example, the protection film may be a plastic film. The frame base member may use a plastic material or a metal material with particular strength.

In an optional embodiment, the protection film is fastened to the frame base member through thermoforming or compression molding. In this case, there is no bonding gap between the protection film and the frame, and a connection between the protection film and the frame is firm and reliable, and the protection film does not easily fall off.

According to a fifth aspect, an embodiment of this application further provides another method for manufacturing a screen protection member. The method for manufacturing a screen protection member includes:

providing a protection film and a frame, where the frame includes at least two frame parts independent of each other; and fastening the at least two frame parts to a peripheral region of a bonding surface of the protection film, where a notch group is formed between two adjacent frame parts in the at least two frame parts, and a single notch group includes two notches disposed opposite to each other.

In this embodiment, based on the method for manufacturing a screen protection member, the frame is formed first, and then the frame is fastened to the protection film. Therefore, a processing step of the frame and a processing step of the protection film can be independent of each other with high controllability and do not adversely affect each other. This helps improve manufacturing precision of the screen protection member formed after the frame is fastened to the protection film.

The protection film is flexible. The frame is rigid. For example, the protection film may be a plastic film. The frame may use a plastic material or a metal material with particular strength.

The protection film is fastened to the frame through thermoforming or compression molding. In this case, there is no bonding gap between the protection film and the frame, and a connection relationship between the protection film and the frame is firm and reliable, and the protection film does not easily fall off.

The protection film may be a film layer with a hollowed-out region (for corresponding to a position at which the notch group of the frame is located), or may be a complete film layer without a hollowed-out region. When the protection film is a complete film layer, in a process of removing a partial material on a frame base member, a partial material of the film layer may be removed synchronously, or the material of the film layer may be not removed.

DESCRIPTION OF EMBODIMENTS

The following describes the embodiments of this application with reference to the accompanying drawings in the embodiments of this application.

Figure 1:
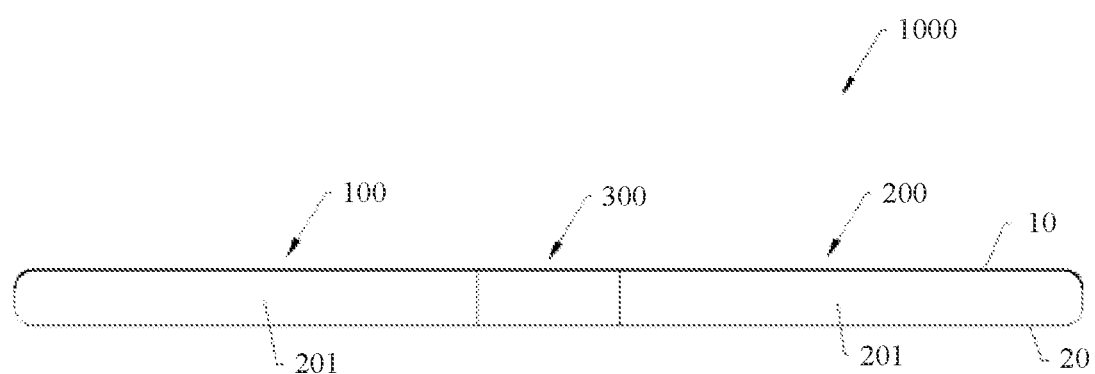
FIG. 1 is a schematic structural diagram of an electronic device in an embodiment according to an embodiment of this application.
Figure 2:
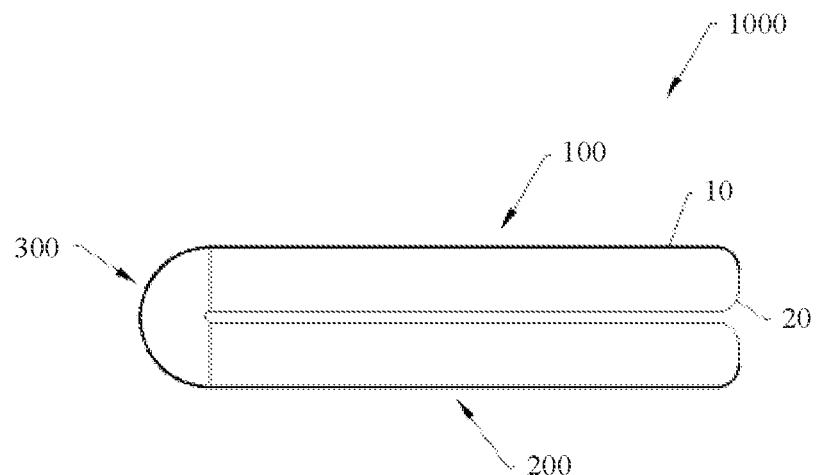
FIG. 2 is a schematic structural diagram of the electronic device shown in FIG. 1 in another use state.

Refer to both FIG. 1 and FIG. 2. FIG. 1 is a schematic structural diagram of an electronic device 1000 in an embodiment according to an embodiment of this application. FIG. 2 is a schematic structural diagram of the electronic device 1000 shown in FIG. 1 in another use state.

The electronic device 1000 shown in this embodiment of this application may be a mobile phone, a tablet computer, a wearable device, or the like. The electronic device 1000 shown in FIG. 1 is described by using a mobile phone as an example.

The electronic device 1000 shown in this embodiment of this application is a foldable electronic device. To be specific, the electronic device 1000 includes at least two parts that can move relative to each other. The at least two parts of the electronic device 1000 can be folded relative to each other to a closed state in a use state, and can be unfolded relative to each other to an open state in another use state. The electronic device 1000 shown in FIG. 1 includes a first part 100 and a second part 200 that can move relative to each other. As shown in FIG. 1, the first part 100 and the second part 200 are unfolded relative to each other to the open state. As shown in FIG. 2, the first part 100 and the second part 200 are folded relative to each other to the closed state. The electronic device 1000 further includes a bending part 300 connected between the first part 100 and the second part 200, and the bending part 300 can deform, so that the first part 100 and the second part 200 can move relative to each other.

As shown in FIG. 1 and FIG. 2, the electronic device 1000 includes a screen assembly 10. The screen assembly 10 is located on the first part 100, the second part 200, and the bending part 300 of the electronic device 1000. A part that is of the screen assembly 10 and that is located on the bending part 300 can bend. In an implementation, as shown in FIG. 2, when the first part 100 and the second part 200 are folded relative to each other to the closed state, the screen assembly 10 is located on an outer side of the electronic device 1000. In another implementation, when the first part 100 and the second part 200 are folded relative to each other to the closed state, the screen assembly 10 may alternatively be located on an inner side of the electronic device 1000.

In an implementation, the electronic device 1000 includes a foldable housing assembly 20. The housing assembly 20 includes at least two housing parts 201 that can be folded or unfolded relative to each other. The at least two housing parts 201 are arranged on at least two parts that are of the electronic device 1000 and that can move relative to each other. In this embodiment, there are two housing parts 201, and the two housing parts 201 are respectively located on the first part 100 and the second part 200. The screen assembly 10 is fastened to the housing assembly 20, to move with the housing assembly 20.

Figure 3:
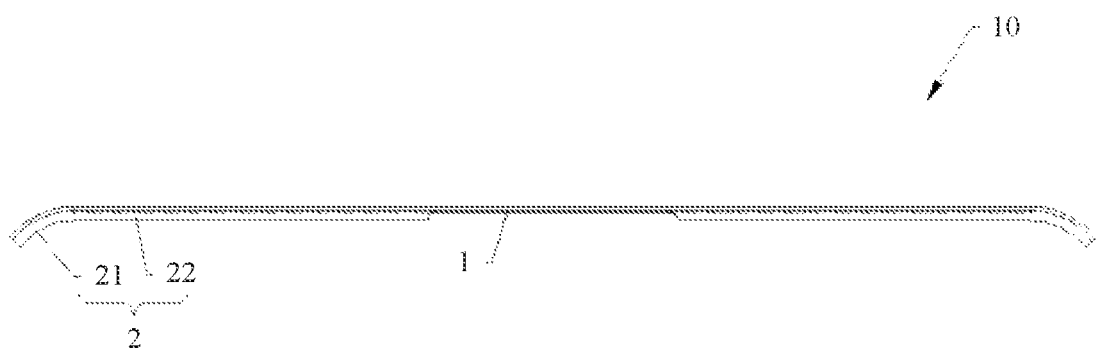
FIG. 3 is a front view of a screen assembly of the electronic device shown in FIG. 1 in a first embodiment.
Figure 4:
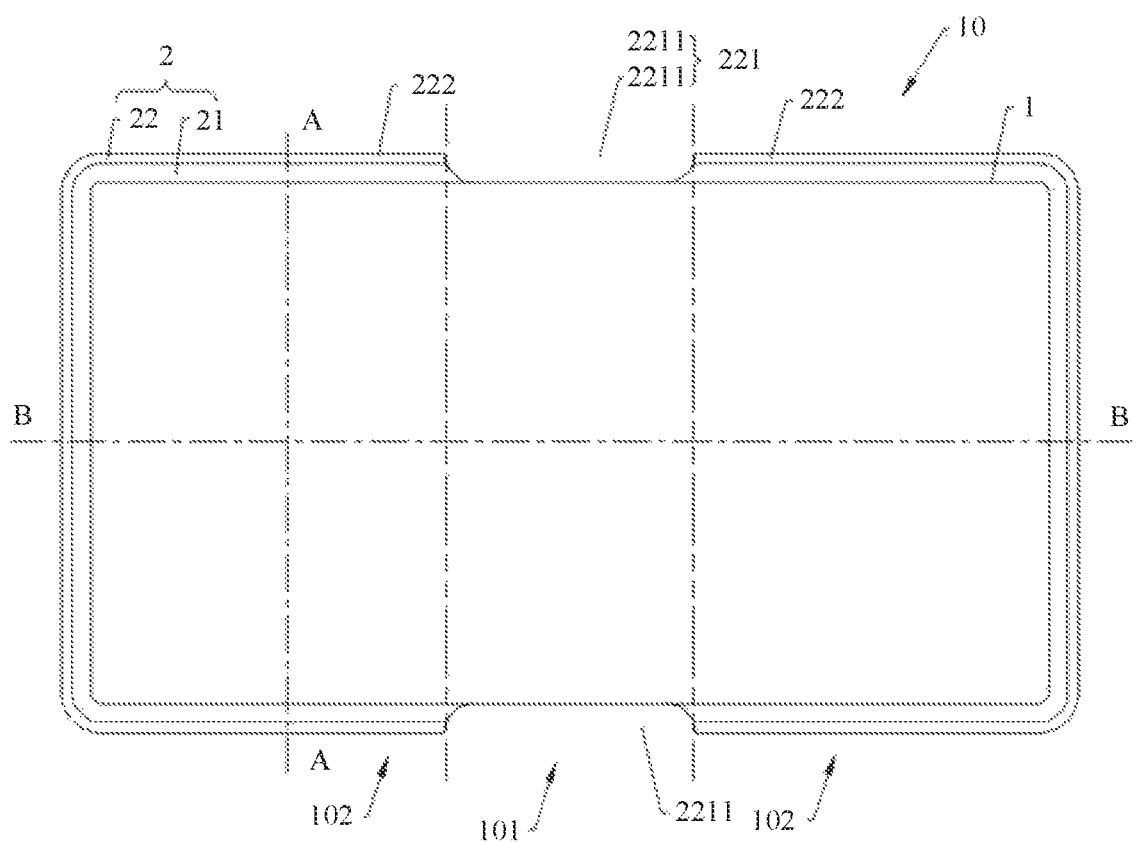
FIG. 4 is a bottom view of the screen assembly shown in FIG. 3.

Refer to both FIG. 3 and FIG. 4. FIG. 3 is a front view of the screen assembly 10 of the electronic device 1000 shown in FIG. 1 in a first embodiment. FIG. 4 is a bottom view of the screen assembly 10 shown in FIG. 3.

Optionally, the screen assembly 10 includes a flexible display panel 1 and a screen protection member 2. The flexible display panel 1 is fastened to the screen protection member 2. The screen protection member 2 can protect the flexible display panel 1, and reduce a risk of damaging the flexible display panel 1, to prolong a service life of the screen assembly 10 and a service life of the electronic device 1000.

The flexible display panel 1 may be an organic light-emitting diode (organic light-emitting diode, OLED) panel, an active-matrix organic light-emitting diode (active-matrix organic light-emitting diode, AMOLED) panel, a mini light-emitting diode (mini organic light-emitting diode) panel, a micro light-emitting diode (micro organic light-emitting diode) panel, a micro organic light-emitting diode (micro organic light-emitting diode) panel, a quantum dot light-emitting diode (quantum dot light-emitting diode, QLED) panel, or the like.

Optionally, the screen protection member 2 includes a protection film 21 and a frame 22. The protection film 21 may be flexible. The frame 22 may be rigid. Flexibility of the protection film 21 and rigidity of the frame 22 are relative. Strength of the protection film 21 is far less than strength of the frame 22. In this application, the protection film 21 easily bends when subject to force, and the frame 22 does not easily bend when subject to force. For example, the protection film 21 may be a plastic film. The frame 22 may use a plastic material or a metal material with particular strength.

Figure 5:
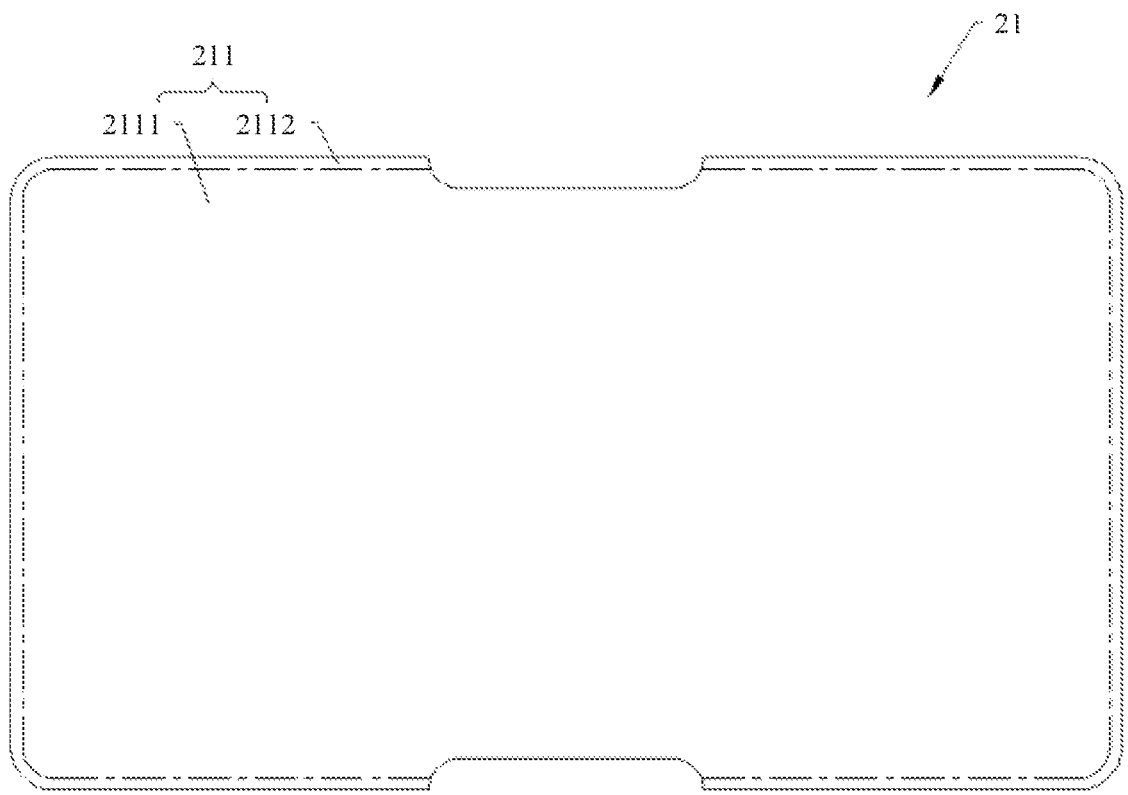
FIG. 5 is a schematic structural diagram of a protection film of a screen protection member of the screen assembly shown in FIG. 4.

Refer to both FIG. 4 and FIG. 5. FIG. 5 is a schematic structural diagram of the protection film 21 of the screen protection member 2 of the screen assembly 10 shown in FIG. 4.

The protection film 21 includes a bonding surface 211. The bonding surface 211 includes a middle region 2111 and a peripheral region 2112. The middle region 2111 of the bonding surface 211 is surrounded by the peripheral region 2112 of the bonding surface 211. The frame 22 is fastened to the peripheral region 2112 of the bonding surface 211 by surrounding the peripheral region 2112. The flexible display panel 1 is fastened to the bonding surface 211 and is located on an inner side of the frame 22. The flexible display panel 1 is fastened to the middle region 2111 of the bonding surface 211. The frame 22 has at least one notch group 221. A single notch group 221 includes two notches 2211 that are disposed opposite to each other. The at least one notch group 221 divides the frame 22 into at least two frame parts 222 that are spaced apart from each other. In this case, the at least two frame parts 222 of the frame 22 are separated from each other by the notch group 221 and can move relative to each other, for example, can be folded relative to each other and unfolded relative to each other, so that the screen protection member 2 can bend by using a position at which the notch group 221 is located, and the screen assembly 10 to which the screen protection member 2 is applied can be folded and unfolded.

In this embodiment, the frame 22 can stably support the protection film 21, so that the screen protection member 2 can maintain good flatness. In this case, the screen assembly 10 to which the screen protection member 2 is applied can also maintain good flatness. Therefore, in the electronic device 1000, the screen assembly 10 can be assembled by using a mounting procedure (for example, snap-fit) between the rigid frame 22 and another rigid component (for example, the housing assembly 20) of the electronic device 1000, to replace a conventional tension step and a conventional surface-to-surface bonding step of a flexible screen. Therefore, the mounting procedure between the rigid structures is simple with a low difficulty, and has a low requirement for devices and processes, so that assembly convenience of an assembly process of the entire electronic device 1000 is higher.

It may be understood that there may be a plurality of manners of the mounting procedure between the rigid frame 22 of the screen assembly 10 and the another rigid component of the electronic device 1000, for example, snap-fit mentioned above, or fastening implemented by using an adhesive. This is not strictly limited in this application.

Optionally, the protection film 21 may be fastened to the frame 22 by using a thermoforming process or a compression molding process. In this case, there is no bonding gap between the protection film 21 and the frame 22, and a connection between the protection film 21 and the frame 22 is firm and reliable, so that air-tightness between the screen assembly 10 and the electronic device 1000 is better.

Optionally, the at least two frame parts 222 of the frame 22 of the screen assembly 10 are respectively fastened to different housing parts 201 (refer to FIG. 1). When the at least two housing parts 201 are folded or unfolded relative to each other, the flexible display panel 1 is driven by the at least two frame parts 222 to be folded or unfolded relative to each other, so that the electronic device 1000 can meet a requirement for large-screen display, and can also meet requirements for miniaturization and convenient carrying. In an embodiment, a quantity of housing parts 201 is the same as a quantity of frame parts 222, the at least two frame parts 222 of the frame 22 are fastened to the at least two housing parts 201 of the housing assembly 20 in a one-to-one correspondence, and one corresponding frame part 222 is mounted on each housing part 201. In the embodiment shown in FIG. 1 and FIG. 3, two frame parts 222 of the frame 22 are mounted on two housing parts 201 of the housing assembly 20 in a one-to-one correspondence. In another embodiment, if the quantity of housing parts 201 is greater than the quantity of frame parts 222, one frame part 222 is mounted on each of some housing parts 201, and no frame part 222 is mounted on some other housing parts 201.

Optionally, the flexible display panel 1 may be fastened to the bonding surface 211 of the protection film 21 by using an adhesive layer (not shown in the figure). The adhesive layer may use an optically clear adhesive (optically clear adhesive, OCA) material. In this case, there is no air gap between the flexible display panel 1 and the bonding surface 211, so that display quality of the screen assembly 10 is better.

It may be understood that, in this application, the screen protection member 2 may be formed first, and then the flexible display panel 1 is fastened to the bonding surface 211 of the protection film 21, to form the screen assembly 10. Alternatively, the flexible display panel 1 may be fastened to the middle region 2111 of the bonding surface 211 of the protection film 21 first, and then the frame 22 is fastened to the peripheral region 2112 of the bonding surface 211 of the protection film 21, to form the screen assembly 10. Steps of a method for manufacturing a screen assembly are not strictly limited in this application.

Figure 6A:
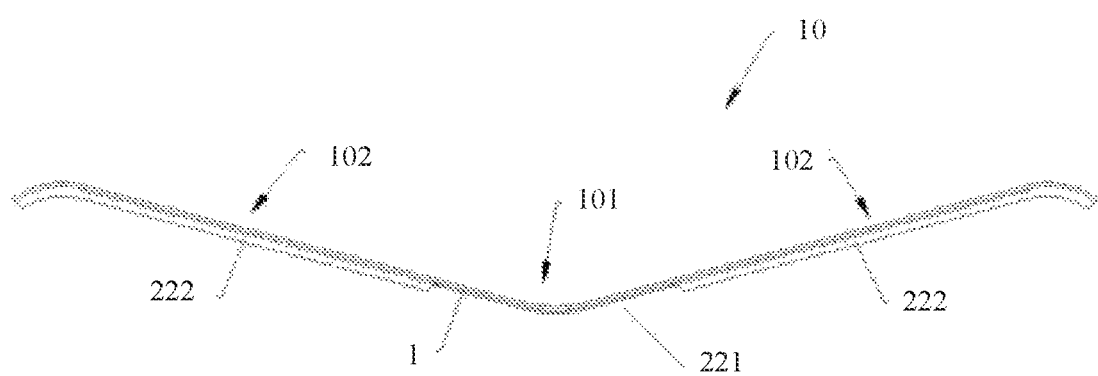
FIG. 6A is a schematic structural diagram of the screen assembly shown in FIG. 3 in a use state.
Figure 6B:
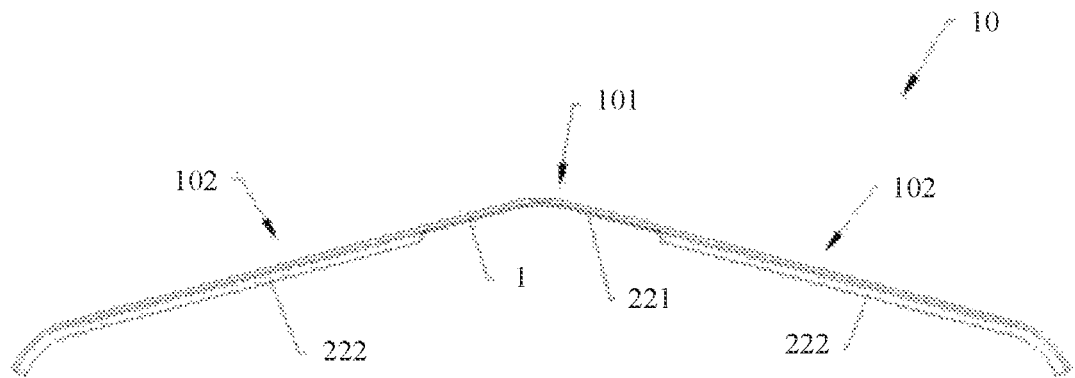
FIG. 6B is a schematic structural diagram of the screen assembly shown in FIG. 3 in another use state.

Refer to FIG. 4, FIG. 6A, and FIG. 6B together. FIG. 6A is a schematic structural diagram of the screen assembly 10 shown in FIG. 3 in a use state. FIG. 6B is a schematic structural diagram of the screen assembly 10 shown in FIG. 3 in another use state.

Optionally, the screen assembly 10 includes a bendable region 101 and a non-bendable region 102. The bendable region 101 corresponds to a position at which the notch group 221 of the frame 22 is located. The non-bendable region 102 corresponds to a position at which the frame part 222 of the frame 22 is located. The screen assembly 10 may bend by using the bendable region 101. For example, as shown in FIG. 6A, the screen assembly 10 may execute, by using the bendable region 101, a folding action for making the flexible display panel 1 outside. As shown in FIG. 6B, the screen assembly 10 may alternatively execute, by using the bendable region, a folding action for making the flexible display panel 1 inside.

Optionally, in the embodiment shown in FIG. 4 and FIG. 5, a region that is of the protection film 21 and that directly faces the at least one notch group 221 is hollowed out. In this case, when the screen assembly 10 bends by using the bendable region 101, resistance is smaller, and folding and unfolding actions of the electronic device 1000 are easier to implement. In addition, in a process of manufacturing the screen protection member 2, a complete frame base member may be fastened to the protection film 21 first, and then a partial material on the frame base member is removed, to form the frame 22 having the at least one notch group 221. In this case, a risk of damaging the protection film 21 can be reduced in a process of removing the partial material on the frame base member, to ensure a manufacturing yield of the screen protection member 2. Certainly, in the process of manufacturing the screen protection member 2, alternatively, a complete frame base member may be fastened to a complete protection film base member, and then a partial material on the frame base member and a partial material on the protection film base member are removed synchronously, to form the frame 22 having the at least one notch group 221 and the protection film 21 having a hollowed-out region. In this case, a degree of matching between an edge of the notch group 221 and an edge of the hollowed-out region of the protection film 21 is high, and appearance consistency of the screen protection member 2 is better. Certainly, the protection film 21 and the frame 22 may alternatively form the screen protection member 2 by using other steps.

It may be understood that, in another embodiment, the region that is of the protection film 21 and that directly faces the at least one notch group 221 may alternatively not be hollowed out. In other words, the protection film 21 is a complete film layer. In this case, the formed frame 22 may be fastened to the protection film 21 to form the screen protection member 2, to avoid damaging the protection film 21 in a process of processing the frame 22, so that a product yield of the screen protection member 2 is higher. Certainly, when processing precision is sufficiently high, a complete frame base member may alternatively be fastened to the protection film 21 first, and then a partial material on the frame base member is removed, to form the frame 22 having the at least one notch group 221. This is not strictly limited in this application.

Optionally, in the embodiment shown in FIG. 4, there is one notch group 221, and there are two frame parts 222. The two frame parts 222 are symmetrically disposed. In this case, the bendable region 101 of the screen assembly 10 is located on a central part of the screen assembly 10, and a bendable region of the screen protection member 2 is located on a central part of the screen protection member 2. The screen assembly 10 can be approximately symmetrically arranged on the first part 100 and the second part 200 of the electronic device 1000, to improve appearance consistency of the electronic device 1000. In addition, the frame 22 may include two frame parts 222 with a same structure, and a requirement of the frame 22 can be satisfied by processing frame parts 222 of only one size, so that material types and costs of the frame 22 can be reduced.

Figure 7:
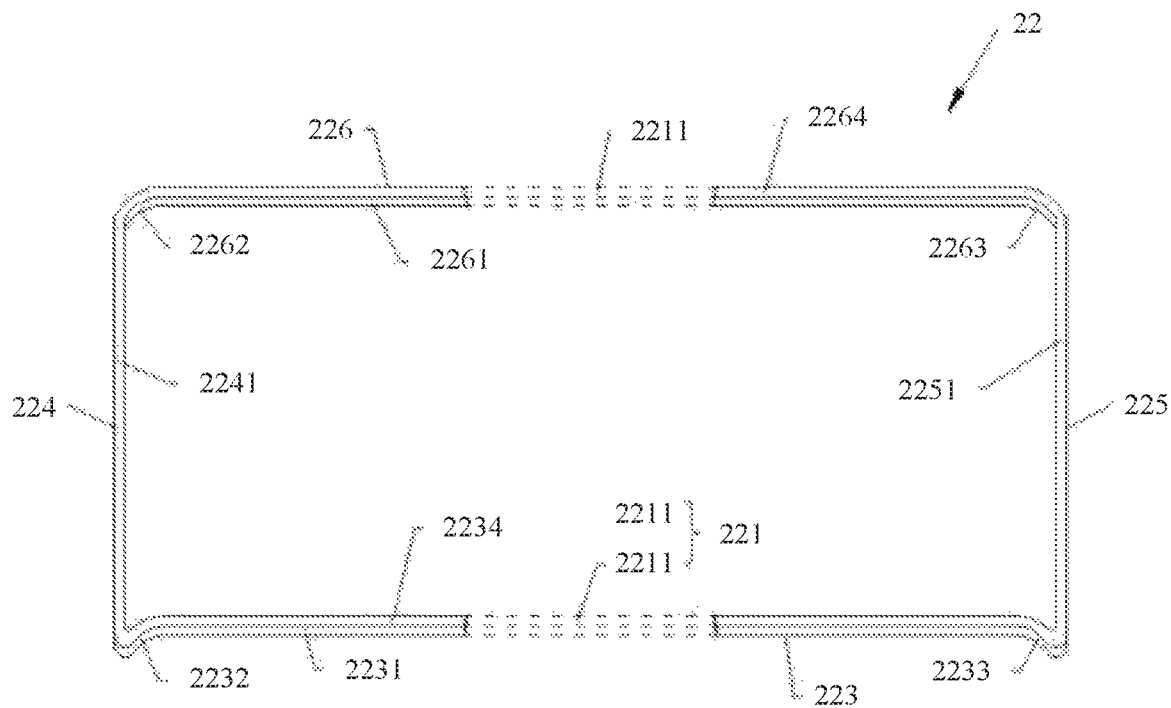
FIG. 7 is a schematic structural diagram of a frame of the screen assembly shown in FIG. 4.

FIG. 7 is a schematic structural diagram of the frame 22 of the screen assembly 10 shown in FIG. 4.

Optionally, the frame 22 includes a first frame body 223 and a second frame body 224 and a third frame body 225 that are opposite to each other and located on two sides of the first frame body 223. The first frame body 223 includes a straight segment 2231 and a first bending segment 2232 and a second bending segment 2233 that are connected to two ends of the straight segment 2231. One notch 2211 in each notch group 221 is located on the straight segment 2231. Both the first bending segment 2232 and the second bending segment 2233 bend toward a side that is of the straight segment 2231 and that is away from the protection film 21 (refer to FIG. 3). The second frame body 224 straightly extends and one end of the second frame body 224 is connected to the first bending segment 2232. The third frame body 225 straightly extends and one end of the third frame body 225 is connected to the second bending segment 2233. The straight segment in this application is a structure whose extending direction is straight, and the bending segment is a structure whose extending direction bends.

In this embodiment, the straight segment 2231 of the first frame body 223 and the second frame body 224 are connected by using the first bending segment 2232, to be located in different planes, and the straight segment 2231 of the first frame body 223 and the third frame body 225 are connected by using the second bending segment 2233, to be located in different planes. The frame 22 is in a three-dimensional structure. In this way, a part that is of the protection film 21 and that is fastened to the straight segment 2231 of the first frame body 223 and parts of the protection film 21 that are fastened to the second frame body 224 and the third frame body 225 are located in different planes. The parts of the protection film 21 that are fastened to the second frame body 224 and the third frame body 225 bend relative to the part that is of the protection film 21 and that is fastened to the straight segment 2231 of the first frame body 223. Therefore, the screen protection member 2 has a three-dimensional structure. The three-dimensional structure includes a middle planar region and bending regions on edges on two sides, so that the screen assembly 10 and the electronic device 1000 have two smooth side edges, and have better appearance experience and handholding experience.

The frame 22 further includes a fourth frame body 226 disposed opposite to the first frame body 223. The fourth frame body 226 is connected between an end that is of the second frame body 224 and that is away from the first frame body 223 and an end that is of the third frame body 225 and that is away from the first frame body 223. The fourth frame body 226 includes a straight segment 2261 and two bending segments (2262/2263) connected to two ends of the straight segment 2261. The two bending segments (2262/2263) are respectively connected to the second frame body 224 and the third frame body 225. The other notch 2211 in each notch group 221 is located on the straight segment 2261 of the fourth frame body 226. Refer to the first frame body 223 for a structural design of the fourth frame body 226.

The straight segment 2261 of the fourth frame body 226 and the straight segment 2231 of the first frame body 223 may be located in a same plane. The second frame body 224 and the third frame body 225 may be located in a same plane.

In another embodiment, the straight segment 2231 of the first frame body 223 and the straight segment 2261 of the fourth frame body 226 may alternatively be replaced with bending segments. In other words, the first frame body 223 and the fourth frame body 226 may include at least one bending segment. When the first frame body 223 and the fourth frame body 226 include a plurality of bending segments, the plurality of bending segments are smoothly connected to each other.

Figure 8:
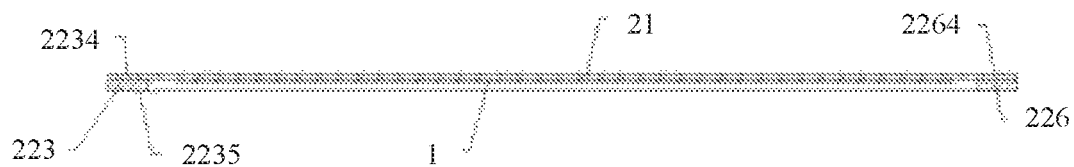
FIG. 8 is a cross-sectional view of the screen assembly shown in FIG. 4 cut along a line A-A.
Figure 9:
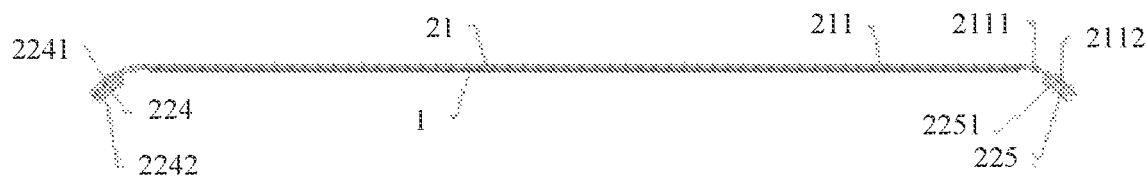
FIG. 9 is a cross-sectional view of the screen assembly shown in FIG. 4 cut along a line B-B.

Refer to FIG. 7 to FIG. 9 together. FIG. 8 is a cross-sectional view of the screen assembly 10 shown in FIG. 4 cut along a line A-A. FIG. 9 is a cross-sectional view of the screen assembly 10 shown in FIG. 4 cut along a line B-B.

Optionally, as shown in FIG. 7 and FIG. 8, the first frame body 223 includes a first bearing surface 2234 connected to the protection film 21. A size of the first bearing surface 2234 in an extending direction of the first bearing surface 2234 is far greater than a size in a vertical direction of the extending direction of the first bearing surface 2234. In this embodiment, the first bearing surface 2234 extends in a direction from the second frame body 224 to the third frame body 225. The first bearing surface 2234 includes at least two parts that are disconnected in the extending direction of the first bearing surface 2234 (two parts are shown in this embodiment, and there may be a plurality of parts in another embodiment). These parts are separated from each other by the notch 2211. A shape of a cross section of the first bearing surface 2234 is a straight line segment. The shape of the cross section of the first bearing surface 2234 is a shape of a cross-section of the first bearing surface 2234 in the vertical direction of the extending direction of the first bearing surface 2234. A cross section shown in FIG. 8 is perpendicular to the extending direction of the first bearing surface 2234, and the first bearing surface 2234 shown in FIG. 8 shows that the shape of the cross-section of the first bearing surface 2234 is a straight line segment.

As shown in FIG. 7 and FIG. 9, the second frame body 224 includes a second bearing surface 2241 connected to the protection film 21. A size of the second bearing surface 2241 in an extending direction of the second bearing surface 2241 is far greater than a size in a vertical direction of the extending direction of the second bearing surface 2241. In this embodiment, the second bearing surface 2241 extends in a direction from the first frame body 223 to the fourth frame body 226. A shape of a cross section of the second bearing surface 2241 is an arc segment or a spline curve segment. The second bearing surface 2241 is smoothly connected to the first bearing surface 2234. The embodiment shown in FIG. 9 is described by using an example in which the shape of the cross section of the second bearing surface 2241 is an arc segment. In this case, the second bearing surface 2241 has a particular radian, and the frame 22 is a three-dimensional frame 22 with arc-shaped edges. The shape of the cross section of the second bearing surface 2241 is a shape of a cross section of the second bearing surface 2241 in the vertical direction of the extending direction of the second bearing surface 2241. A cross section shown in FIG. 9 is perpendicular to the extending direction of the second bearing surface 2241, and the second bearing surface 2241 shown in FIG. 9 shows that the shape of the cross section of the second bearing surface 2241 is an arc segment.

In this embodiment, the first bearing surface 2234 and the second bearing surface 2241 jointly support the protection film 21, so that a middle part of the protection film 21 is flat and edges on two sides of the protection film 21 bend. In this way, the screen protection member 2 forms a three-dimensional structure, so that the protection film 21 can not only be well supported, but also have bending edges.

The third frame body 225 includes a third bearing surface 2251 connected to the protection film 21. A shape of a cross section of the third bearing surface 2251 is an arc segment or a spline curve segment. The third bearing surface 2251 is smoothly connected to the first bearing surface 2234. The fourth frame body 226 includes a fourth bearing surface 2264 connected to the protection film 21. A shape of a cross section of the fourth bearing surface 2264 is a straight line segment. The fourth bearing surface 2264 is smoothly connected to the second bearing surface 2241 and the third bearing surface 2251. The first bearing surface 2234, the second bearing surface 2241, the third bearing surface 2251, and the fourth bearing surface 2264 jointly support edge regions on a periphery of the protection film 21.

It may be understood that, shapes of other surfaces of the frame bodies of the frame 22 are not strictly limited in this application. For example, as shown in FIG. 8, the first frame body 223 further includes a first mounting surface 2235 disposed opposite to the first bearing surface 2234. The first mounting surface 2235 may be disposed parallel to the first bearing surface 2234. In this case, the first frame body 223 is approximately in a shape of an elongated flat plate. In another embodiment, alternatively, an included angle may be formed between the first mounting surface 2235 and the first bearing surface 2234. In other words, the first mounting surface 2235 is tilted relative to the first bearing surface 2234. As shown in FIG. 9, the second frame body 224 further includes a second mounting surface 2242 disposed opposite to the second bearing surface 2241. The second mounting surface 2242 may be disposed parallel to the second bearing surface 2241. In this case, the second frame body 224 is approximately in a shape of an elongated bending plate. In another embodiment, alternatively, an included angle may be formed between the second mounting surface 2242 and the second bearing surface 2241. In other words, the second mounting surface 2242 is tilted relative to the second bearing surface 2241. For example, the second frame body 224 may be in a shape of a triangular strip.

Optionally, as shown in FIG. 9, in this embodiment, the flexible display panel 1 may be planar as a whole. The screen assembly 10 forms a planar display form. In this case, the middle region 2111 of the bonding surface 211 of the protection film 21 is planar as a whole. Alternatively, a central part of the middle region 2111 of the bonding surface 211 is planar, and a periphery (connected to the peripheral region 2112) of the middle region 2111 of the bonding surface 211 is in a shape of a curved surface. A bending angle of a side part of the middle region 2111 of the bonding surface 211 may be set to be relatively small. This is not strictly limited in this application. In another embodiment, when the bending angle of the side part of the middle region 2111 of the bonding surface 211 is relatively large, and space is relatively large, an edge of the flexible display panel 1 may also appropriately bend with the side part of the middle region 2111, to implement display on a side edge of the screen assembly 10, so that the screen assembly 10 has a larger display area.

In another embodiment, a shape of the cross section of the first bearing surface 2234 in FIG. 8 may alternatively include a straight line segment and an arc segment connected to an end of the straight line segment. The arc segment is located on a side that is of the straight line segment and that is away from the flexible display panel 1. In this case, the periphery of the protection film 21 can be in a shape of a curved surface. Two sides (for example, left and right sides) of the protection film 21 have large curved surfaces, and the other two sides (for example, upper and lower sides) have small curved surfaces.

Figure 10:
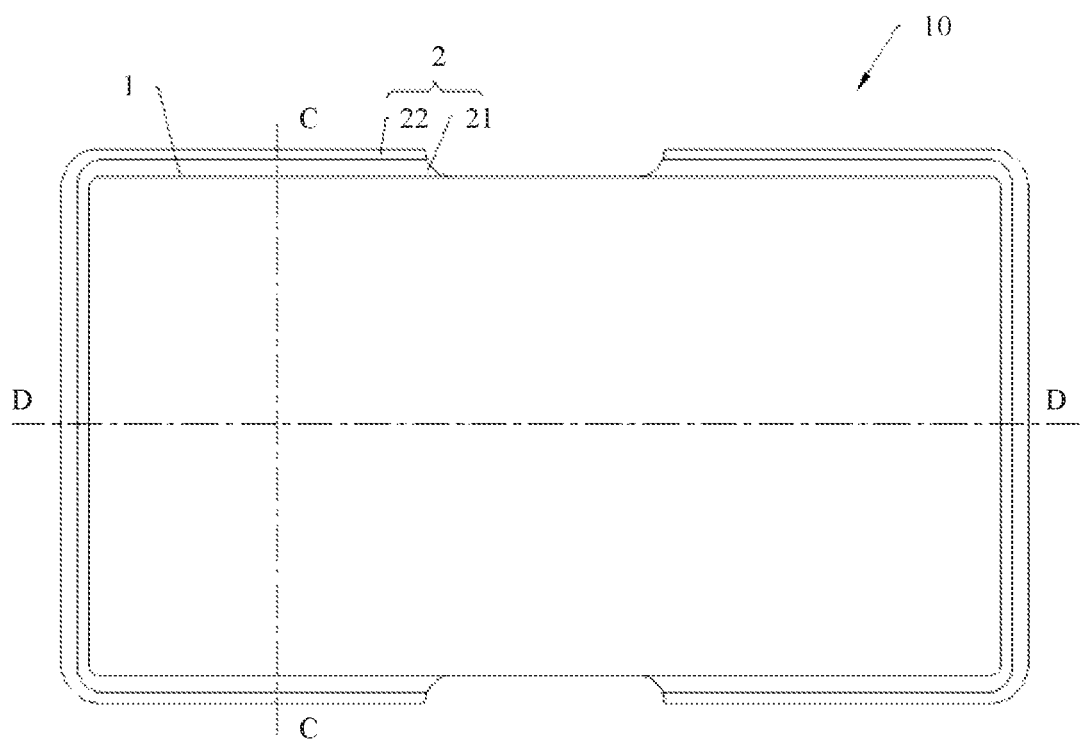
FIG. 10 is a bottom view of the screen assembly of the electronic device shown in FIG. 1 in a second embodiment.
Figure 11:
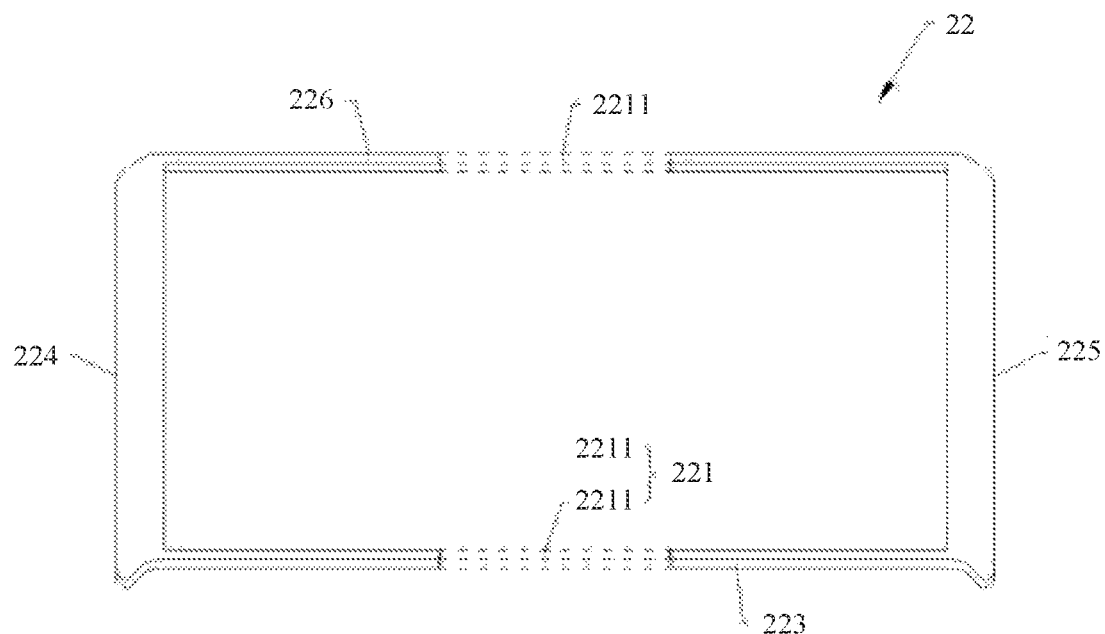
FIG. 11 is a schematic structural diagram of a frame of the screen assembly shown in FIG. 10.

Refer to both FIG. 10 and FIG. 11. FIG. 10 is a bottom view of the screen assembly 10 of the electronic device 1000 shown in FIG. 1 in a second embodiment. FIG. 11 is a schematic structural diagram of the frame 22 of the screen assembly 10 shown in FIG. 10. Some technical content of the screen assembly 10 shown in the second embodiment that is the same as that of the screen assembly 10 shown in the first embodiment is not described again in the following descriptions.

The frame 22 of the screen protection member 2 of the screen assembly 10 includes a first frame body 223 and a second frame body 224 and a third frame body 225 that are opposite to each other and connected to two ends of the first frame body 223. The frame 22 further includes a fourth frame body 226 disposed opposite to the first frame body 223. The fourth frame body 226 is connected between an end part that is of the second frame body 224 and that is away from the first frame body 223 and an end part that is of the third frame body 225 and that is away from the first frame body 223. One notch 2211 in each notch group 221 is located on the first frame body 223. The other notch 2211 in each notch group 221 is located on the fourth frame body 226. In this embodiment, if the frame 22 includes one notch group 221, one notch 2211 is provided on the first frame body 223, and one notch 2211 is provided on the fourth frame body 226. The first frame body 223, the second frame body 224, and the third frame body 225 all straightly extend. The fourth frame body 226 also straightly extends. In this case, a processing difficulty of the frame 22 is relatively low.

Figure 12:
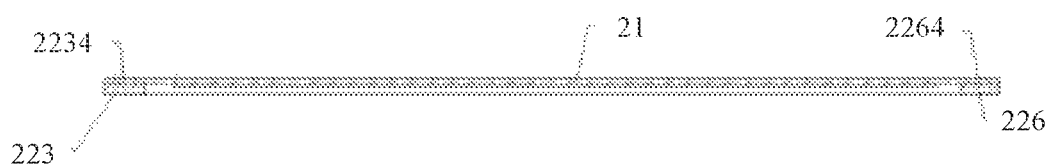
FIG. 12 is a cross-sectional view of the screen assembly shown in FIG. 10 cut along a line C-C.
Figure 13:
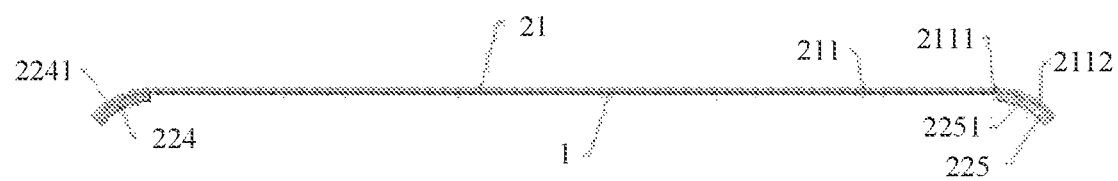
FIG. 13 is a cross-sectional view of the screen assembly shown in FIG. 10 cut along a line D-D.

Refer to FIG. 11 to FIG. 13 together. FIG. 12 is a cross-sectional view of the screen assembly 10 shown in FIG. 10 cut along a line C-C. FIG. 13 is a cross-sectional view of the screen assembly 10 shown in FIG. 10 cut along a line D-D.

The first frame body 223 includes a first bearing surface 2234 connected to the protection film 21, and a shape of a cross section of the first bearing surface 2234 is a straight line segment. The second frame body 224 includes a second bearing surface 2241 connected to the protection film 21, and a shape of a cross section of the second bearing surface 2241 is an arc segment or a spline curve segment. In this embodiment, the first bearing surface 2234 and the second bearing surface 2241 jointly support the protection film 21, so that a middle part of the protection film 21 is flat and edges on two sides of the protection film 21 bend. In this way, the screen protection member 2 forms a three-dimensional structure, so that the protection film 21 can not only be well supported, but also have bending edges.

The third frame body 225 includes a third bearing surface 2251 connected to the protection film 21. A shape of a cross section of the third bearing surface 2251 is an arc segment or a spline curve segment. The fourth frame body 226 includes a fourth bearing surface 2264 connected to the protection film 21. A shape of a cross section of the fourth bearing surface 2264 is a straight line segment. The first bearing surface 2234, the second bearing surface 2241, the third bearing surface 2251, and the fourth bearing surface 2264 are smoothly connected to each other. The first bearing surface 2234, the second bearing surface 2241, the third bearing surface 2251, and the fourth bearing surface 2264 jointly support edge regions on four edges of the protection film 21.

In this embodiment, as shown in FIG. 9, the middle region 2111 of the bonding surface 211 of the protection film 21 is planar as a whole, and the peripheral region 2112 of the bonding surface 211 is in a shape of a curved surface. The flexible display panel 1 is bonded to the middle region 2111 of the bonding surface 211 for planar display.

In another embodiment, the shape of the cross section of the second bearing surface 2241 may alternatively be a straight line segment. The shape of the cross section of the third bearing surface 2251 is also a straight line segment. In this case, the first bearing surface 2234, the second bearing surface 2241, the third bearing surface 2251, and the fourth bearing surface 2264 are coplanar.

Figure 14:
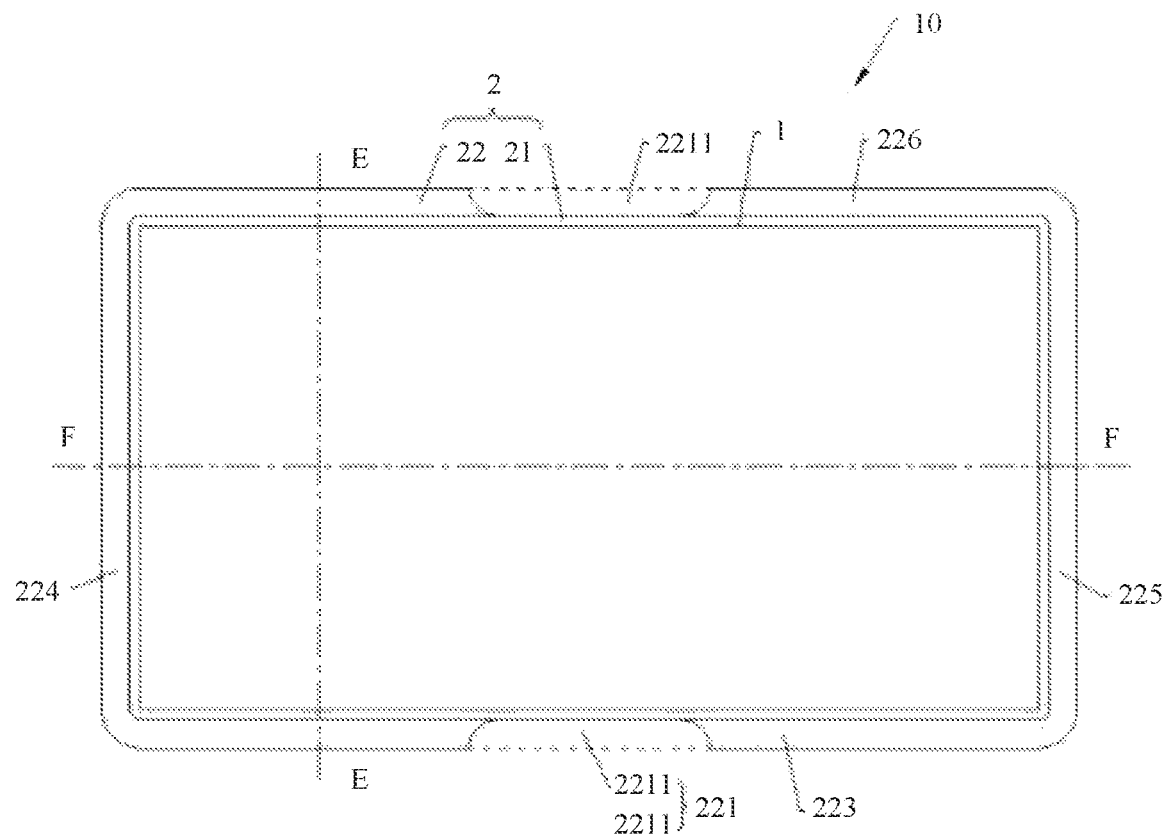
FIG. 14 is a bottom view of the screen assembly of the electronic device shown in FIG. 1 in a third embodiment.
Figure 15:
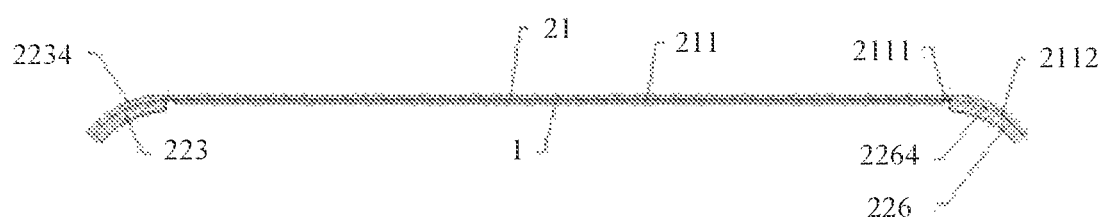
FIG. 15 is a cross-sectional view of the screen assembly shown in FIG. 14 cut along a line E-E.
Figure 16:
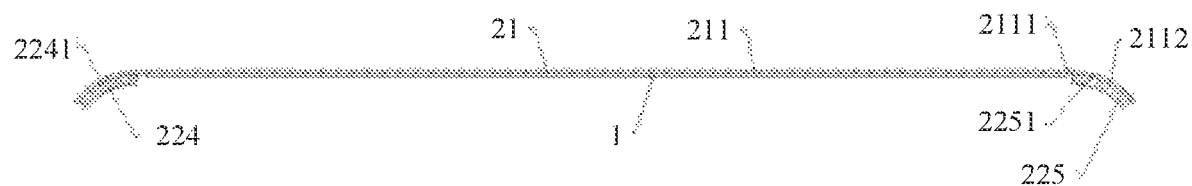
FIG. 16 is a cross-sectional view of the screen assembly shown in FIG. 14 cut along a line F-F.

Refer to FIG. 14 to FIG. 16 together. FIG. 14 is a bottom view of the screen assembly 10 of the electronic device 1000 shown in FIG. 1 in a third embodiment. FIG. 15 is a cross-sectional view of the screen assembly 10 shown in FIG. 14 cut along a line E-E. FIG. 16 is a cross-sectional view of the screen assembly 10 shown in FIG. 14 cut along a line F-F. Some technical content of the screen assembly 10 shown in the third embodiment that is the same as that of the screen assembly 10 shown in the foregoing embodiments is not described again in the following descriptions.

The frame 22 of the screen protection member 2 of the screen assembly 10 includes a first frame body 223 and a second frame body 224 and a third frame body 225 that are opposite to each other and connected to two ends of the first frame body 223. The frame 22 further includes a fourth frame body 226 disposed opposite to the first frame body 223. The fourth frame body 226 is connected between an end part that is of the second frame body 224 and that is away from the first frame body 223 and an end part that is of the third frame body 225 and that is away from the first frame body 223. One notch 2211 in each notch group 221 is located on the first frame body 223. The other notch 2211 in each notch group 221 is located on the fourth frame body 226. In this embodiment, if the frame 22 includes one notch group 221, one notch 2211 is provided on the first frame body 223, and one notch 2211 is provided on the fourth frame body 226. The first frame body 223, the second frame body 224, and the third frame body 225 all straightly extend. The fourth frame body 226 also straightly extends.

That the first frame body 223 straightly extends means that a main body of the first frame body 223 straightly extends, and end parts of the first frame body 223 that are connected to the second frame body 224 and the third frame body 225 may extend in a bending manner, to be smoothly connected to the second frame body 224 and the third frame body 225. A length of the end part of the first frame body 223 is far less than a length of the main body of the first frame body 223. Similarly, end parts of the second frame body 224 are smoothly connected to an end part of the first frame body 223 and an end part of the fourth frame body 226. The third frame body 225 is smoothly connected to an end part of the first frame body 223 and an end part of the fourth frame body 226. The fourth frame body 226 is smoothly connected to an end part of the second frame body 224 and an end part of the third frame body 225. Straight extension of the second frame body 224, straight extension of the third frame body 225, and straight extension of the fourth frame body 226 are understood in a same way.

The first frame body 223 includes a first bearing surface 2234 connected to the protection film 21, and a shape of a cross section of the first bearing surface 2234 is an arc segment or a spline curve segment. The second frame body 224 includes a second bearing surface 2241 connected to the protection film 21, and a shape of a cross section of the second bearing surface 2241 is an arc segment or a spline curve segment. The first bearing surface 2234 and the second bearing surface 2241 jointly support the protection film 21, so that a middle part of the protection film 21 is flat and edges on a periphery of the protection film 21 bend. In this way, the screen protection member 2 forms a three-dimensional structure, so that the protection film 21 can not only be well supported, but also have bending edges.

The third frame body 225 includes a third bearing surface 2251 connected to the protection film 21. A shape of a cross section of the third bearing surface 2251 is an arc segment or a spline curve segment. The fourth frame body 226 includes a fourth bearing surface 2264 connected to the protection film 21. A shape of a cross section of the fourth bearing surface 2264 is an arc segment or a spline curve segment. The first bearing surface 2234, the second bearing surface 2241, the third bearing surface 2251, and the fourth bearing surface 2264 are smoothly connected to each other. The first bearing surface 2234, the second bearing surface 2241, the third bearing surface 2251, and the fourth bearing surface 2264 jointly support edge regions on four edges of the protection film 21.

The bonding surface 211 further includes a middle region 2111, and the middle region 2111 is surrounded by the peripheral region 2112. The middle region 2111 of the bonding surface 211 is planar. The flexible display panel 1 is fastened to the middle region 2111 of the bonding surface 211 for planar display. The frame 22 is supported on the peripheral region 2112 of the bonding surface 211, so that the peripheral region 2112 on four edges bends.

Figure 17:
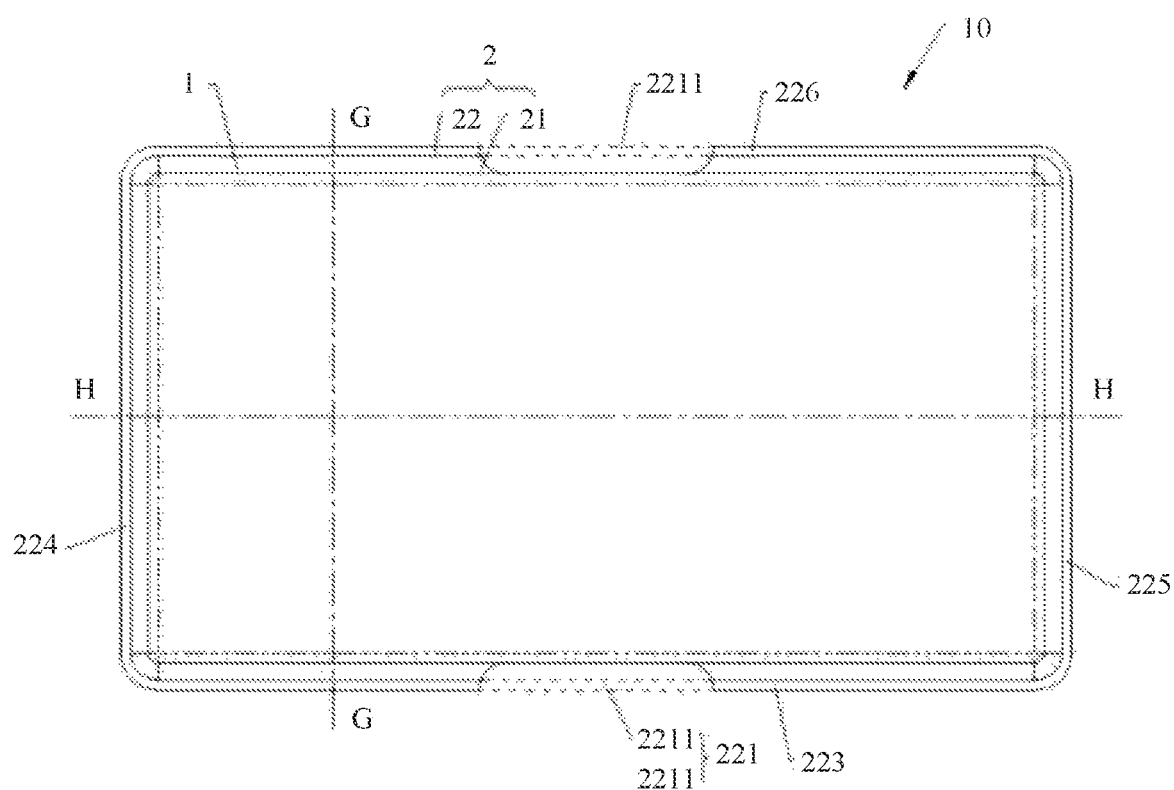
FIG. 17 is a bottom view of the screen assembly of the electronic device shown in FIG. 1 in a fourth embodiment.
Figure 18:
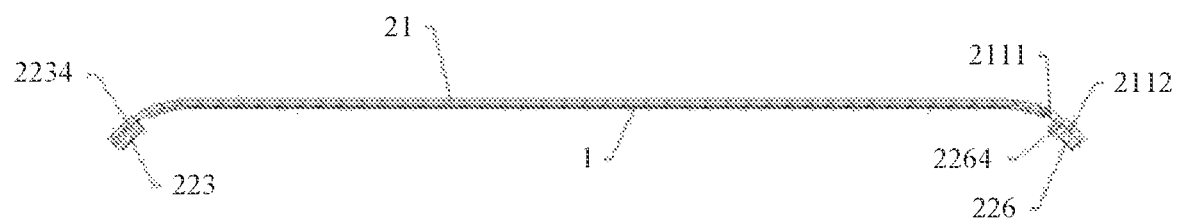
FIG. 18 is a cross-sectional view of the screen assembly shown in FIG. 17 cut along a line G-G.
Figure 19:
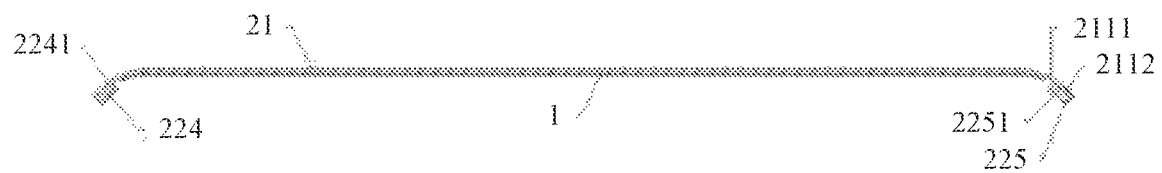
FIG. 19 is a cross-sectional view of the screen assembly shown in FIG. 17 cut along a line H-H.
Figure 20:
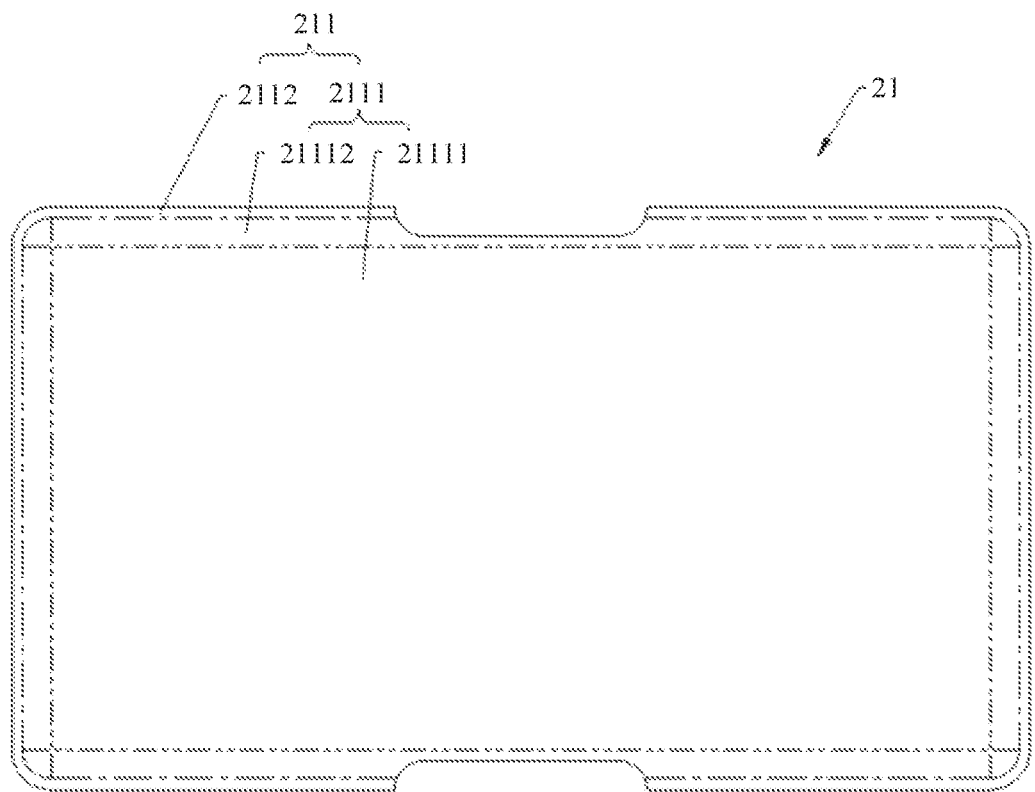
FIG. 20 is a schematic structural diagram of a protection film of the screen assembly shown in FIG. 17.

Refer to FIG. 17 to FIG. 20 together. FIG. 17 is a bottom view of the screen assembly 10 of the electronic device 1000 shown in FIG. 1 in a fourth embodiment. FIG. 18 is a cross-sectional view of the screen assembly 10 shown in FIG. 17 cut along a line G-G. FIG. 19 is a cross-sectional view of the screen assembly 10 shown in FIG. 17 cut along a line H-H. FIG. 20 is a schematic structural diagram of the protection film 21 of the screen assembly 10 shown in FIG. 17. Some technical content of the screen assembly 10 shown in the fourth embodiment that is the same as that of the screen assembly 10 shown in the foregoing embodiments is not described again in the following descriptions.

In this embodiment, the frame 22 of the screen protection member 2 of the screen assembly 10 includes a first frame body 223, a second frame body 224, a third frame body 225, and a fourth frame body 226 that straightly extend. The two notches 2211 in the notch group 221 are respectively provided on the first frame body 223 and the fourth frame body 226.

The first frame body 223 includes a first bearing surface 2234 connected to the protection film 21. The second frame body 224 includes a second bearing surface 2241 connected to the protection film 21. The third frame body 225 includes a third bearing surface 2251 connected to the protection film 21. The fourth frame body 226 includes a fourth bearing surface 2264 connected to the protection film 21. Shapes of cross sections of the first bearing surface 2234, the second bearing surface 2241, the third bearing surface 2251, and the fourth bearing surface 2264 are arc segments or spline curve segments. The frame 22 is fastened to the peripheral region 2112 of the bonding surface 211 of the protection film 21. The first bearing surface 2234, the second bearing surface 2241, the third bearing surface 2251, and the fourth bearing surface 2264 jointly support the protection film 21, so that edges on the periphery of the protection film 21 keep bending.

The flexible display panel 1 is fastened to the middle region 2111 of the bonding surface 211. A periphery 21112 of the middle region 2111 of the bonding surface 211 is located between a central part 21111 of the middle region 2111 and the peripheral region 2112. The central part 21111 of the middle region 2111 of the bonding surface 211 protrudes in a direction away from the frame 22 relative to the periphery 21112 of the middle region 2111 (embodied as being recessed downwardly relative to a plane in which the peripheral region 2112 is located in FIG. 20). In this case, the periphery 21112 of the middle region 2111 of the bonding surface 211 bends, and continuously bends together with the peripheral region 2112 of the bonding surface 211. The flexible display panel 1 may be partially located on the periphery 21112 of the middle region 2111 of the bonding surface 211, to implement four-side-curved-surface display.

Figure 21:
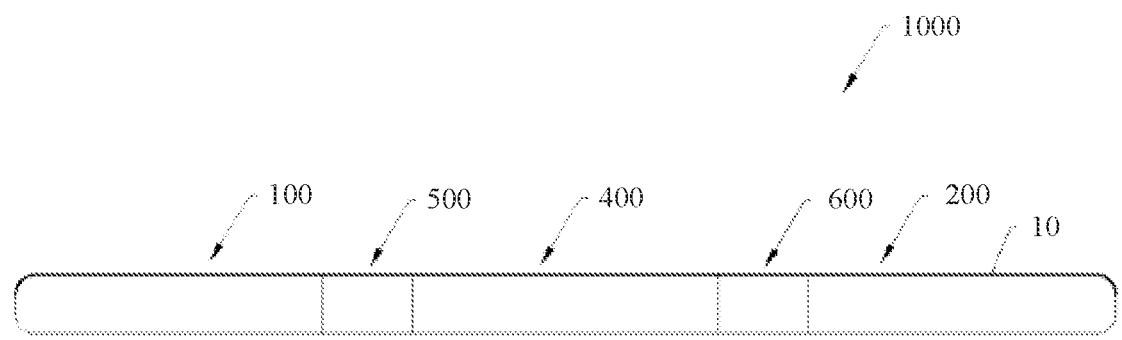
FIG. 21 is a schematic structural diagram of an electronic device in another embodiment according to an embodiment of this application.
Figure 22:
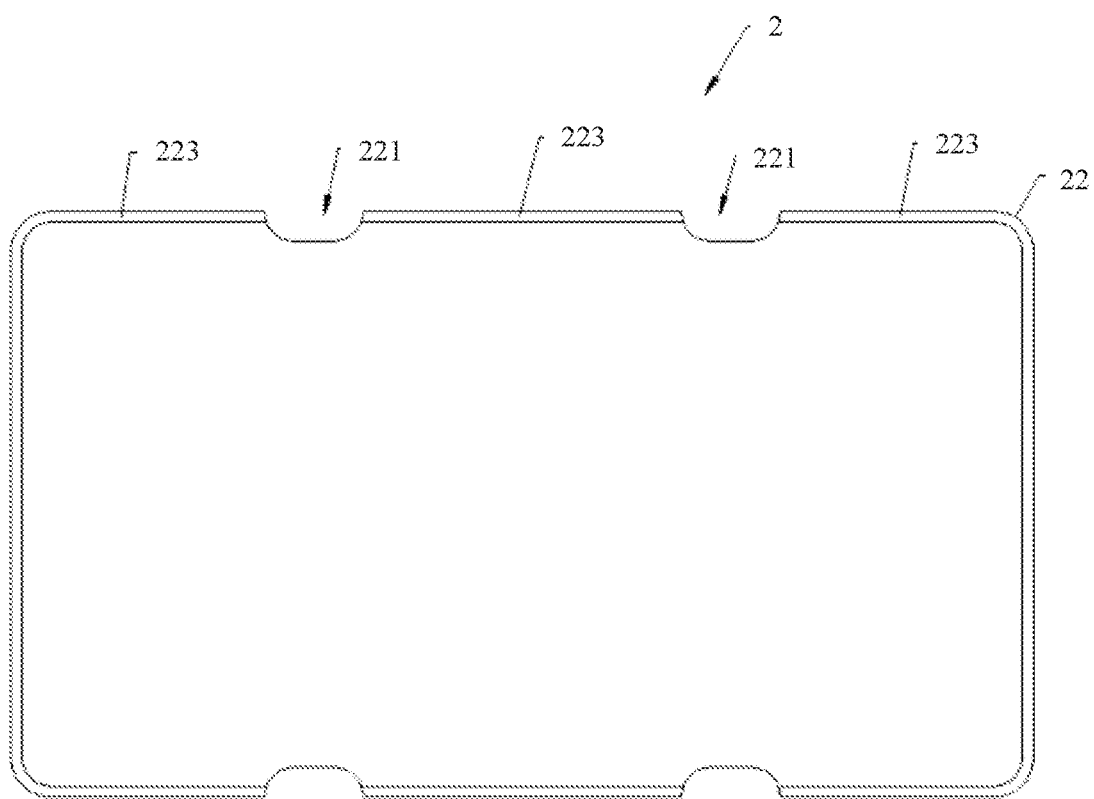
FIG. 22 is a schematic structural diagram of a screen protection member of a screen assembly of the electronic device shown in FIG. 21.

Refer to both FIG. 21 and FIG. 22. FIG. 21 is a schematic structural diagram of the electronic device 1000 in another embodiment according to an embodiment of this application. FIG. 22 is a schematic structural diagram of the screen protection member 2 of the screen assembly 10 of the electronic device 1000 shown in FIG. 21. Some technical content of the electronic device 1000 shown in this embodiment that is the same as that of the electronic device 1000 shown in the foregoing embodiment is not described again in the following descriptions.

In this embodiment, the electronic device 1000 includes a first part 100, a second part 200, and a third part 400 that can move relative to each other, and the third part 400 is located between the first part 100 and the second part 200. The electronic device 1000 further includes a first bending part 500 located between the first part 100 and the third part 400 and a second bending part 600 located between the third part 400 and the second part 200. The first bending part 500 and the second bending part 600 can deform, to enable the first part 100, the second part 200, and the third part 400 to be folded or unfolded relative to each other. There are a plurality of manners of folding or unfolding the first part 100, the second part 200, and the third part 400 relative to each other. This is not strictly limited in this application.

The electronic device 1000 includes a screen assembly 10, and the screen assembly 10 is continuously located on the first part 100, the first bending part 500, the third part 400, the second bending part 600, and the second part 200. There are two notch groups 221 on the frame 22 of the screen protection member 2 of the screen assembly 10, and there are three frame parts 222. In an implementation, two frame parts 222 that are in the three frame parts 222 and that are located on an edge are symmetrically disposed. In this case, the screen protection member 2 has a relatively small quantity of material types and relatively low costs. In another embodiment, two frame parts 222 that are in the three frame parts 222 and that are located on an edge may alternatively have a different structural design.

Figure 23:
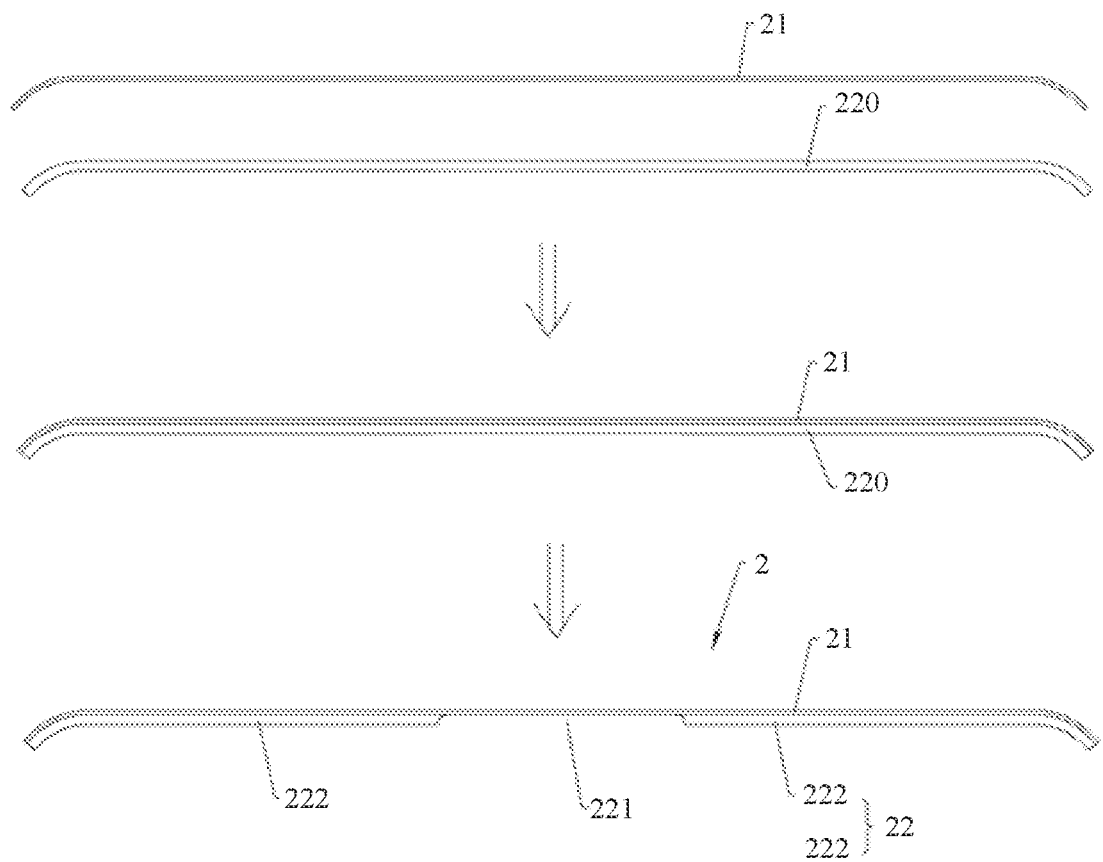
FIG. 23 is a schematic structural diagram corresponding to a method for manufacturing a screen protection member according to an embodiment of this application.

An embodiment of this application further provides a method for manufacturing a screen protection member. The manufacturing method may be used for manufacturing the screen protection member 2 shown in the foregoing embodiments. FIG. 23 is a schematic structural diagram corresponding to a method for manufacturing a screen protection member according to an embodiment of this application. A structure shown in FIG. 23 is described by using an example in which the screen protection member 2 has one notch group 221.

The method for manufacturing a screen protection member includes:

Step 011: Fasten a protection film 21 to a frame base member 220. The frame base member 220 continuously surrounds a peripheral region 2112 of a bonding surface 211 of the protection film 21 (refer to FIG. 5). The protection film 21 may be flexible. The frame base member 220 may be rigid. For example, the protection film 21 may be a plastic film. The frame base member 220 may use a plastic material or a metal material with particular strength.

Step 013: Remove a partial material on the frame base member 220, to form a frame 22 having at least one notch group 221. A single notch group 221 includes two notches that are disposed opposite to each other. The at least one notch group 221 divides the frame 22 into at least two frame parts 222 that are spaced apart from each other.

In this embodiment, based on the method for manufacturing a screen protection member, the integral frame base member 220 is fastened to the protection film 21 first, and then a part of the frame base member 220 is removed to form the frame 22 having at least two frame parts 222. Therefore, all the at least two frame parts 222 can be fastened to the protection film 21 by using one positioning procedure and one fastening procedure, and a position relationship between the at least two frame parts 222 is accurate and reliable, so that production efficiency is improved, and a product yield is relatively high.

It may be understood that, in step 021, the protection film 21 may be a film layer with a hollowed-out region (for corresponding to a position at which a notch group 221 in step 023 is located), or may be a complete film layer without a hollowed-out region. When the protection film 21 is a complete film layer, in a process of removing the partial material on the frame base member 220 in step 023, a partial material of the film layer may be removed synchronously, or the material of the film layer may not be removed.

The protection film 21 is fastened to the frame base member 220 through thermoforming or compression molding. In this case, there is no bonding gap between the protection film 21 and the frame 22, and a connection relationship between the protection film 21 and the frame 22 is firm and reliable, and the protection film 21 does not easily fall off.

Figure 24:
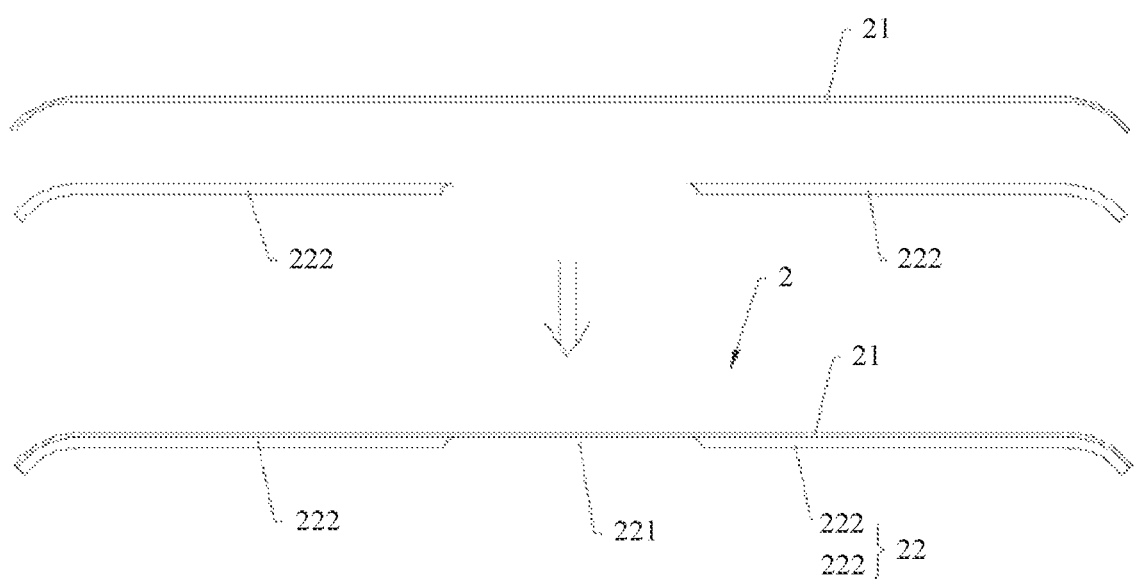
FIG. 24 is a schematic structural diagram corresponding to another method for manufacturing a screen protection member according to an embodiment of this application.

An embodiment of this application further provides another method for manufacturing a screen protection member. The manufacturing method may be used for manufacturing the screen protection member 2 shown in the foregoing embodiments. FIG. 24 is a schematic structural diagram corresponding to another method for manufacturing a screen protection member according to an embodiment of this application. A structure shown in FIG. 24 is described by using an example in which the screen protection member 2 has one notch group 221.

The method for manufacturing a screen protection member includes:

Step 021: Provide a protection film 21 and a frame 22. The frame 22 includes at least two frame parts 222 independent of each other. The protection film 21 is flexible. The frame 22 is rigid. For example, the protection film 21 may be a plastic film. The frame 22 may use a plastic material or a metal material with particular strength.

Step 023: Fasten the at least two frame parts 222 to a peripheral region 2112 of a bonding surface 211 of the protection film 21 (refer to FIG. 5). A notch group 221 is formed between two adjacent frame parts 222 in the at least two frame parts 222, and a single notch group 221 includes two notches disposed opposite to each other.

In this embodiment, based on the method for manufacturing a screen protection member, the frame 22 is formed first, and then the frame 22 is fastened to the protection film 21. Therefore, a processing step of the frame 22 and a processing step of the protection film 21 can be independent of each other with high controllability and do not adversely affect each other. This helps improve manufacturing precision of the screen protection member 2 formed after the frame 22 is fastened to the protection film 21.

It may be understood that, in step 021, the protection film 21 may be a film layer with a hollowed-out region (for corresponding to a position at which a notch group 221 in step 023 is located), or may be a complete film layer without a hollowed-out region.

The protection film 21 is fastened to the frame 22 through thermoforming or compression molding. In this case, there is no bonding gap between the protection film 21 and the frame 22, and a connection relationship between the protection film 21 and the frame 22 is firm and reliable, and the protection film 21 does not easily fall off.

The foregoing descriptions are merely specific implementations of this application, but are not intended to limit the protection scope of this application. Any variation or replacement readily figured out by a person skilled in the art within the technical scope disclosed in this application shall fall within the protection scope of this application. If there is no conflict, the embodiments of this application and the features in the embodiments may be combined with each other. Therefore, the protection scope of this application shall be subject to the protection scope of the claims.

What is claimed is:

1. A screen protection member, comprising:
   a protection film comprising a bonding surface and a peripheral region, wherein the bonding surface comprises a middle region, and wherein the middle region is surrounded by the peripheral region; and
   a frame fastened to the peripheral region by surrounding the peripheral region and comprising at least one notch group,
   wherein a central part of the middle region protrudes in a direction away from the frame relative to a periphery of the middle region,
   wherein the periphery of the middle region is located between the central part of the middle region and the peripheral region,
   wherein a single notch group in the at least one notch group comprises two notches that are disposed opposite from each other, and
   wherein the at least one notch group divides the frame into at least two frame parts that are spaced apart from each other.

2. The screen protection member of claim 1, wherein the frame comprises a first frame body, a second frame body, and a third frame body, wherein the second frame body and the third frame body are opposite from each other and located on two sides of the first frame body, wherein the first frame body comprises a straight segment, a first bending segment, and a second bending segment, wherein the first bending segment and the second bending segment are connected to two ends of the straight segment, wherein one notch in each notch group is located on the straight segment, wherein both the first bending segment and the second bending segment bend toward a side of the straight segment that is away from the protection film, wherein the second frame body extends and has a first end that is connected to the first bending segment, and wherein the third frame body extends and has a second end that is connected to the second bending segment.

3. The screen protection member of claim 2, wherein the first frame body comprises a first bearing surface connected to the protection film, wherein a first shape of a first cross section of the first bearing surface is a straight line segment, wherein the second frame body comprises a second bearing surface connected to the protection film, and wherein a second shape of a second cross section of the second bearing surface is an arc segment or a spline curve segment.

4. The screen protection member of claim 1, wherein the frame comprises a first frame body, a second frame body, and a third frame body, wherein the second frame body and the third frame body are opposite from each other and are connected to two ends of the first frame body, wherein each of the first frame body, the second frame body, and the third frame body extend outward, and wherein one notch in each notch group is located on the first frame body.

5. The screen protection member of claim 4, wherein the first frame body comprises a first bearing surface connected to the protection film, wherein a first shape of a first cross section of the first bearing surface is a straight line segment, wherein the second frame body comprises a second bearing surface connected to the protection film, and wherein a second shape of a second cross section of the second bearing surface is an arc segment or a spline curve segment.

6. The screen protection member of claim 4, wherein the first frame body comprises a first bearing surface connected to the protection film, wherein a first shape of a first cross section of the first bearing surface is a first arc segment or a first spline curve segment, wherein the second frame body comprises a second bearing surface connected to the protection film, and wherein a second shape of a second cross section of the second bearing surface is a second arc segment or a second spline curve segment.

7. The screen protection member of claim 6, wherein the middle region is planar.

8. The screen protection member of claim 1, wherein the frame is made of a plastic material or a metal material.

9. The screen protection member of claim 1, wherein the protection film comprises a region that directly faces the at least one notch group and is hollowed out.

10. The screen protection member of claim 1, wherein the at least one notch group is one notch group, wherein the at least two frame parts are two frame parts, and wherein the two frame parts are symmetrically disposed.

11. The screen protection member of claim 1, wherein the at least one notch group is two notch groups, wherein the at least two frame parts are three frame parts, and wherein two of the three frame parts are located on an edge and are symmetrically disposed.

12. The screen protection member of claim 1, wherein the frame is made of a plastic material.

13. The screen protection member of claim 1, wherein the frame is made of a metal material.

14. The screen protection member of claim 1, wherein the protection film comprises an optically clear adhesive material configured to fasten the screen protection member to a display panel.

15. The screen protection member of claim 1, further comprising a snap-fit connection configured to fasten the screen protection member to a display panel.

16. The screen protection member of claim 1, wherein a shape of the peripheral region of the protection film comprises a curved surface.

17. A screen assembly, comprising:
a protection film comprising a bonding surface and a peripheral region, wherein the bonding surface comprises a middle region, and wherein the middle region is surrounded by the peripheral region; and
a frame fastened to the peripheral region and comprising at least one notch group, a first frame body, a second frame body, and a third frame body,
wherein a central part of the middle region protrudes in a direction away from the frame relative to a periphery of the middle region,
wherein the periphery of the middle region is located between the central part of the middle region and the peripheral region,
wherein a single notch group in the at least one notch group comprises two notches that are disposed opposite from each other,
wherein the at least one notch group divides the frame into at least two frame parts that are spaced apart from each other,
wherein the second frame body and the third frame body are opposite from each other and located on two sides of the first frame body,
wherein the first frame body comprises a straight segment, a first bending segment, and a second bending segment,
wherein the first bending segment and the second bending segment are connected to two ends of the straight segment,
wherein one notch in each notch group is located on the straight segment,
wherein both the first bending segment and the second bending segment bend toward a side of the straight segment that is away from the protection film,
wherein the second frame body extends and has a first end that is connected to the first bending segment, and
wherein the third frame body extends and has a second end that is connected to the second bending segment.

18. A method, comprising:
fastening a protection film to a frame base member, wherein the frame base member continuously surrounds a peripheral region of a bonding surface of the protection film, wherein the bonding surface comprises a middle region, and wherein the middle region is surrounded by the peripheral region; and
removing material of the frame base member to form a frame having at least one notch group,
wherein a central part of the middle region protrudes in a direction away from the frame relative to a periphery of the middle region,
wherein the periphery of the middle region is located between the central part of the middle region and the peripheral region,
wherein a single notch group in the at least one notch group comprises two notches that are disposed opposite from each other, and
wherein the at least one notch group divides the frame into at least two frame parts that are spaced apart from each other.

19. The method of claim 18, further comprising fastening the frame base member through thermoforming.

20. The method of claim 18, further comprising fastening the frame base member through compression molding.

* * * * *